US009658829B2

(12) United States Patent
Vaithianathan et al.

(10) Patent No.: US 9,658,829 B2
(45) Date of Patent: May 23, 2017

(54) NEAR OPTIMAL CONFIGURABLE ADDER TREE FOR ARBITRARY SHAPED 2D BLOCK SUM OF ABSOLUTE DIFFERENCES (SAD) CALCULATION ENGINE

(75) Inventors: Karthikeyan Vaithianathan, Beaverton, OR (US); Arvind Sudarsanam, Logan, UT (US)

(73) Assignee: Intel Corporation, Santa Clara, CA (US)

(*) Notice: Subject to any disclaimer, the term of this patent is extended or adjusted under 35 U.S.C. 154(b) by 1325 days.

(21) Appl. No.: 12/581,482

(22) Filed: Oct. 19, 2009

(65) Prior Publication Data
US 2011/0093518 A1   Apr. 21, 2011

(51) Int. Cl.
*G06F 7/50*   (2006.01)
*G06F 7/544*   (2006.01)
*G06F 17/10*   (2006.01)
*G06F 7/508*   (2006.01)
*G06F 7/505*   (2006.01)

(52) U.S. Cl.
CPC .............. *G06F 7/544* (2013.01); *G06F 17/10* (2013.01); *G06F 7/505* (2013.01); *G06F 7/508* (2013.01); *G06F 2207/5442* (2013.01)

(58) Field of Classification Search
None
See application file for complete search history.

(56) References Cited

U.S. PATENT DOCUMENTS

| 6,127,842 A * | 10/2000 | Dalal et al. ..................... 326/38 |
| 8,131,788 B1* | 3/2012 | Chirila-Rus ............ G06F 7/544 |
| | | 708/201 |
| 2002/0116567 A1* | 8/2002 | Vondran, Jr. ..................... 711/3 |
| 2005/0238102 A1* | 10/2005 | Lee et al. ................. 375/240.16 |
| 2010/0100576 A1* | 4/2010 | Willson, Jr. .................. 708/300 |

FOREIGN PATENT DOCUMENTS

| CN | 1138717 A | 12/1996 |
| CN | 1625266 A | 6/2005 |
| CN | 101140511 A | 3/2008 |
| CN | 201054141 Y | 4/2008 |

(Continued)

OTHER PUBLICATIONS

Combined search and Examination Report Received for European Patent Application No. GB1015956.4 mailed on Dec. 21, 2010, 6 Pages.

(Continued)

*Primary Examiner* — Steven Snyder
*Assistant Examiner* — Aurangzeb Hassan
(74) *Attorney, Agent, or Firm* — Finch & Maloney PLLC

(57) ABSTRACT

Embodiments of a near optimal configurable adder tree for arbitrary shaped 2D block sum of absolute differences (SAD) calculation engine are generally described herein. Other embodiments may be described and claimed. In some embodiments, a configurable two-dimensional adder tree architecture for computing a sum of absolute differences (SAD) for various block sizes up to 16 by 16 comprises a first stage of one-dimensional adder trees and a second stage of one-dimensional adder trees, wherein each one-dimensional adder tree comprises an input routing network, a plurality of adder units, and an output routing network.

20 Claims, 6 Drawing Sheets

(56) References Cited

FOREIGN PATENT DOCUMENTS

| CN | 101461245 A | 6/2009 |
|---|---|---|
| DE | 10109392 C1 | 10/2002 |
| JP | 09-204364 A | 8/1997 |
| TW | 200604930 A | 2/2006 |
| TW | 200620093 A | 6/2006 |
| WO | 2006/108912 A1 | 10/2006 |

OTHER PUBLICATIONS

Office Action received for Chinese Patent Application No. 201010538974.7, mailed on Sep. 21, 2012, 5 pages of Chinese Office Action and 6 pages of English Translation.
Office Action received for German Patent Application No. 10 2010 046 117.2, mailed on Nov. 20, 2012, 7 pages of German Office Action and 5 pages of English Translation.
Chen et al., "Analysis and Architecture Design of Variable Block-Size Motion Estimation for H.264/AVC", IEEE Trans. on Circuits and Systems I, vol. 53, No. 2, Feb. 2006, pp. 578-593.
Office Action Received for Taiwanese Patent Application No. 099131816 , mailed on Jan. 23, 2015, 7 Pages of Taiwanese Office Action and 1 Pages of English Translation (Search Report only).
Office Action received for German Patent Application No. 10 2010 046 117.2, mailed on Jul. 1, 2016, 5 pages of German Office Action and 2 pages of English Translation.
Sudarsanam, et al., "Analysis and Design of a Context Adaptable SAD/MSE Architecture", International Journal of Reconfigurable Computing, vol. 2009, Article ID 789592, 21 pages (2009).

\* cited by examiner

NEAR OPTIMAL CONFIGURABLE ADDER TREE FOR ARBITRARY SHAPED 2D BLOCK SUM OF ABSOLUTE DIFFERENCES (SAD) CALCULATION ENGINE

TECHNICAL FIELD

The present invention generally relates to adder trees, and in particular to a near optimal configurable adder tree for arbitrary shaped 2D block sum of absolute differences (SAD) calculation engine.

BACKGROUND

Video processing applications, such as block based motion estimation in video encoders, block based trajectory estimation for image stabilization, line angle detection in deinterlacing and motion analysis in frame rate conversion utilize two-dimensional (2D) block sum of absolute differences (SAD) between pixels. Various applications, however, require different block sizes, for example, Deinterlacer requires 5×3 block SAD while H.264 video encoding standard requires 4×4 to 16×16 block SADs. Software implementations of SAD require many clock cycles, while a hardware implementation that is configurable for arbitrary block sizes would generally require a large number of multiplexors and routing wires. For a detailed discussion into the background and other prior art solutions, please refer to "Analysis and Design of a Context Adaptable SAD/MSE Architecture," Arvind Sudarsanam, Aravind Raghavendra Dasu, and Karthik Vaithianathan, International Journal of Reconfigurable Computing, accepted May 27, 2009, available from Hindawi Publishing Corporation.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

The present invention describes a near optimal configurable adder tree for arbitrary shaped 2D block sum of absolute differences (SAD) calculation engine that with defined pipelined adder resources required to perform addition and defined routing network resources required to configure adder trees for various block sizes. The embodiments presented resulted from a constraint optimization with the intent of minimizing routing network resources namely the number of multiplexors, number of multiplexor inputs and routing wires. This optimization problem was shown to be non-polynomial (NP) hard and constraints were applied to prune the solution space. A near optimal solution (in terms of # of 2 input multiplexors) was produced from which the configurable 1D SAD tree architecture that follows is derived. The outputs of the 1D tree are generated in-order to avoid re-ordering using an output routing network. Finally the 2D adder architecture is realized using cascaded two-stage 1D units, with each stage comprising of multiple configurable 1D SAD tree architectures. Since the 1D array output is ordered, there is no additional routing overhead between the two stages.

Figure 1:
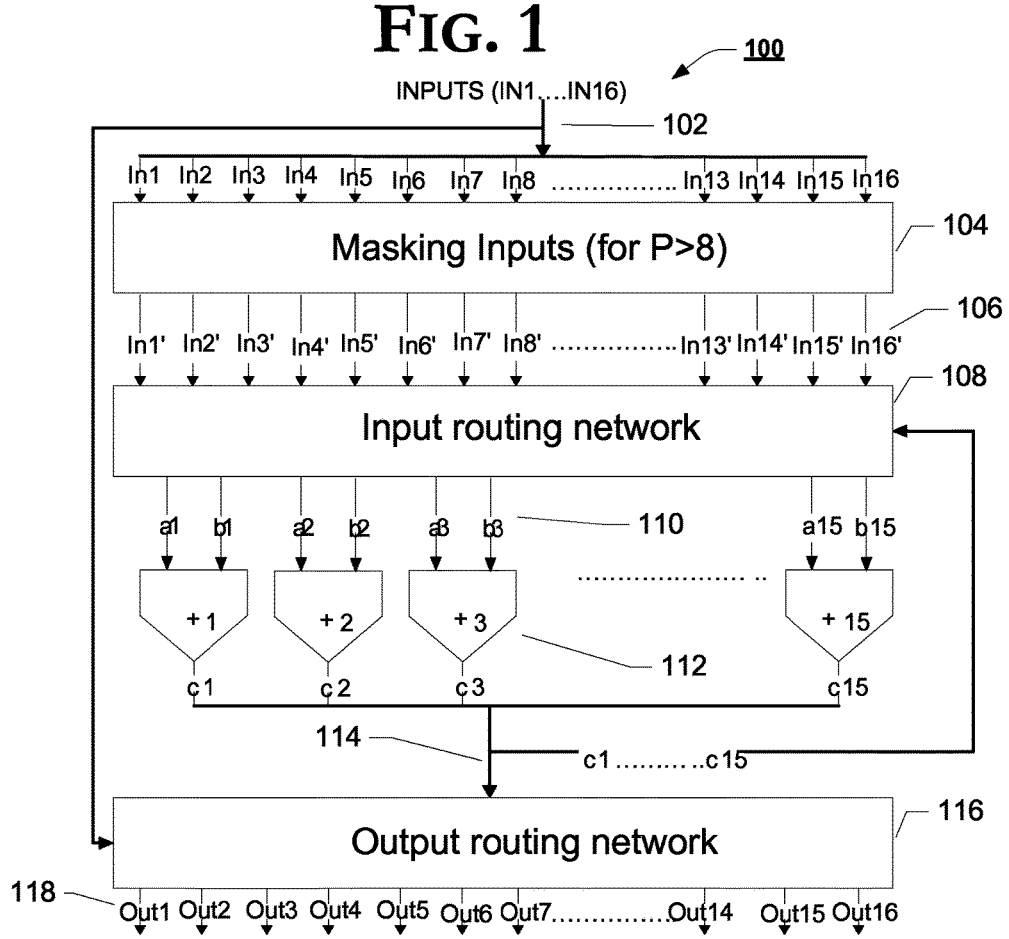
FIG. 1 is a block diagram of an example one-dimensional adder tree in accordance with some embodiments of the present invention.

FIG. 1 is a block diagram of an example one-dimensional adder tree in accordance with some embodiments of the present invention. As shown adder tree 100 includes tree inputs 102, masking inputs 104, masking outputs 106, input routing network 108, adder inputs 110, adder units 112, adder outputs 114, output routing network 116 and tree outputs 118. Tree inputs 102 may represent sixteen eight bit lines for 1D block sizes from one to sixteen. Tree inputs 102 are routed to masking inputs 104 and also to output routing network 116.

Figure 2:
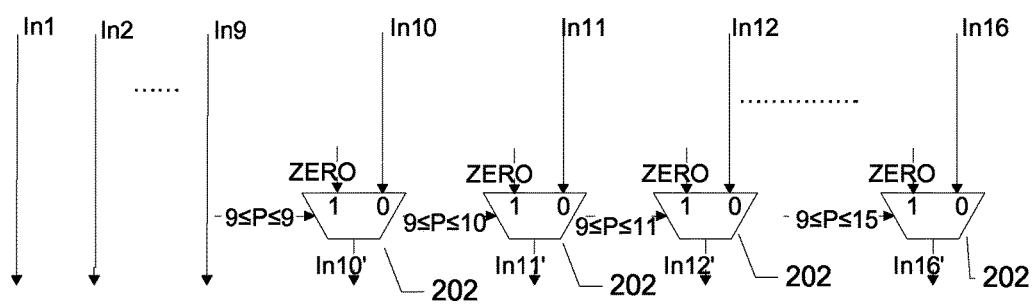
FIG. 2 is a circuit diagram of an example input masking network in accordance with some embodiments of the present invention.

Masking inputs 104 and masking outputs 106 are shown in greater detail with reference to FIG. 2 and accommodate the fact that data flows for certain block sizes need to have certain inputs masked out.

Figure 3:
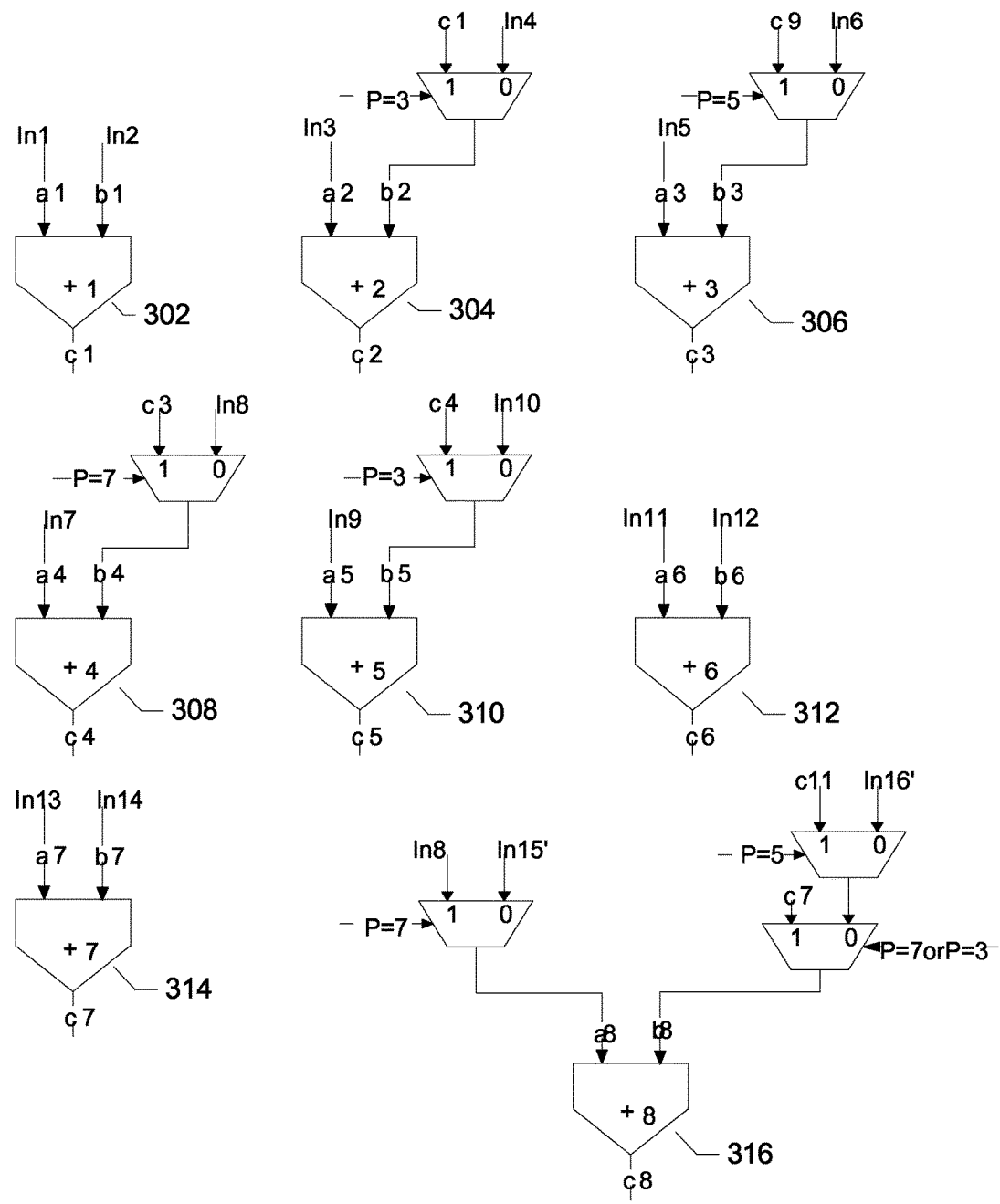
FIG. 3 is a circuit diagram of an example input routing network for adder units 1-8 in accordance with some embodiments of the present invention.
Figure 4:
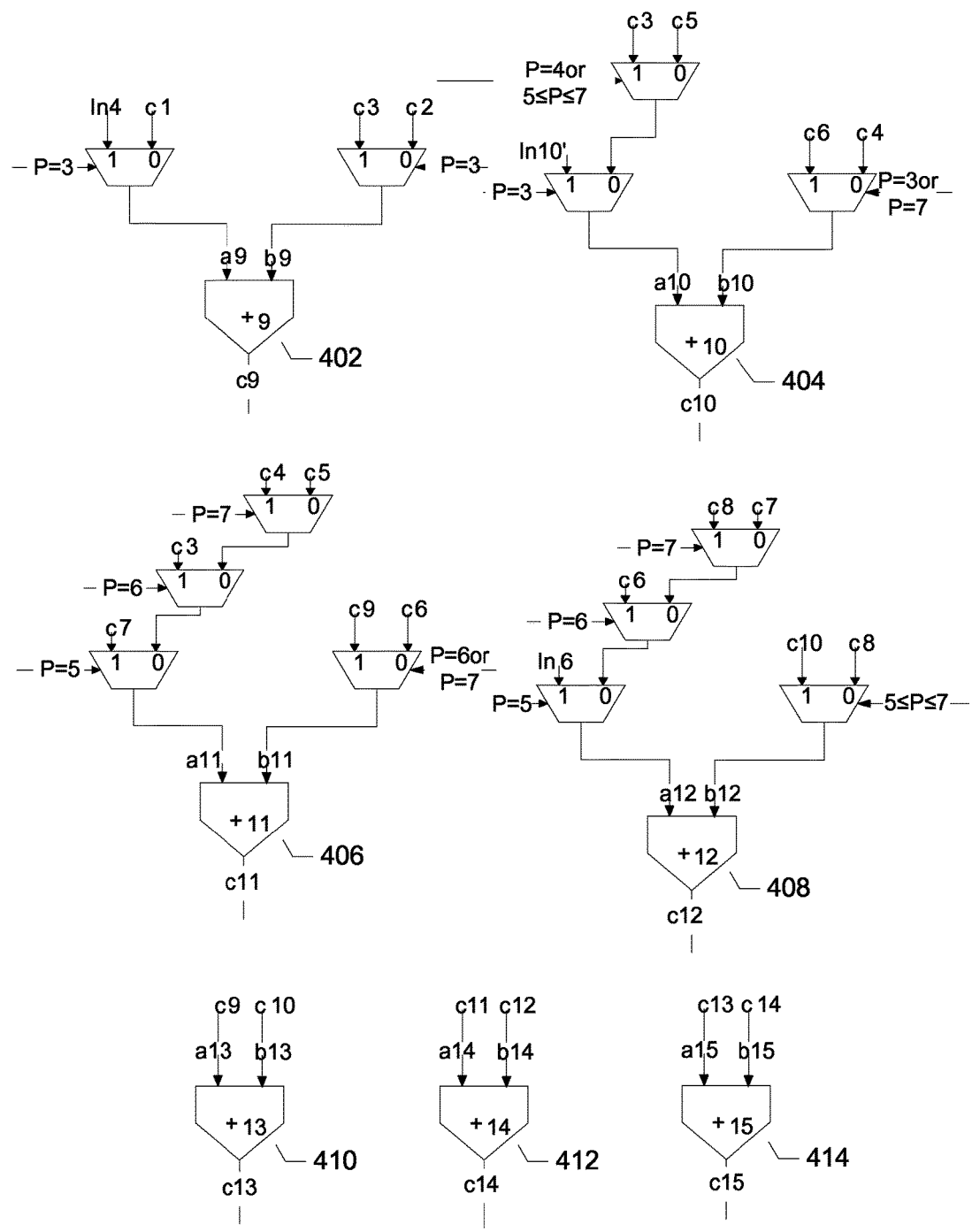
FIG. 4 is a circuit diagram of an example input routing network for adder units 9-15 in accordance with some embodiments of the present invention.

Input routing network 108 orders the masked inputs and adder outputs 114 to provide adder inputs 110 to adder units 112 for any block size as shown in greater detail in reference to FIGS. 3 and 4.

Figure 5:
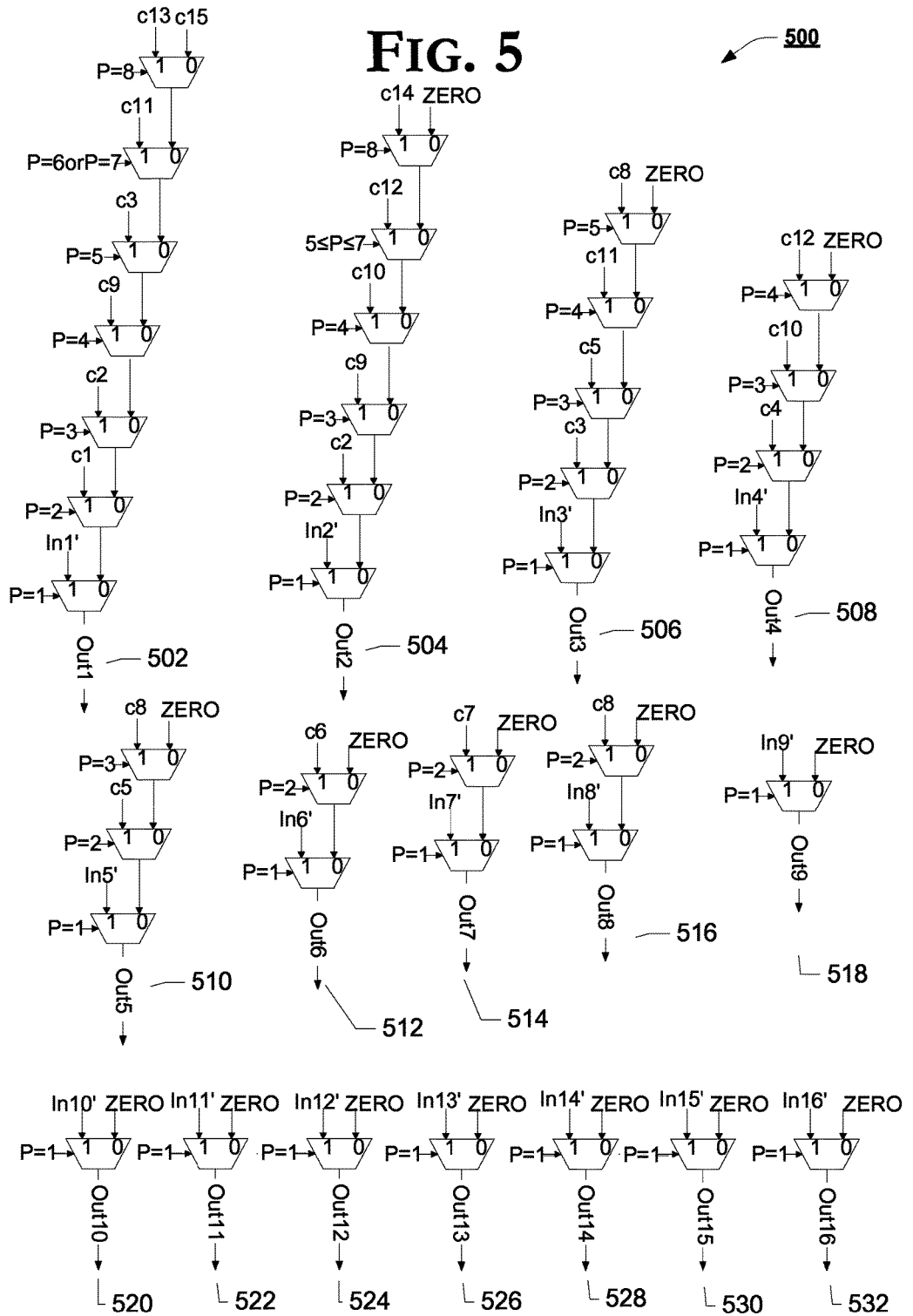
FIG. 5 is a circuit diagram of an example output routing network in accordance with some embodiments of the present invention.

Output routing network 116 orders tree outputs 118 for any block size as shown in greater detail in reference to FIG. 5.

FIG. 2 is a circuit diagram of an example input masking network in accordance with some embodiments of the present invention. Masking network 200 masks out certain tree inputs 102 for certain block sizes (P) greater than 8 based on the unique data flows. Multiplexors 202 are provided for inputs 10-16, resulting in seven multiplexors 202. Each multiplexor 202 will either pass the corresponding input through or mask it out with a zero depending on the value of P. For example, if P were 9, inputs 10-16 would be masked out with zeros, while if P were 15 only input 16 would be masked out with zeros, and if P were 4 all the inputs would pass through without being masked out with zeros.

FIGS. 3 and 4 are circuit diagrams of an example input routing network for 15 adder units in accordance with some embodiments of the present invention. Fifteen adder units are needed since the data flow for a block size of sixteen involves one possible 1D SAD operation with fifteen addition operations, as shown in the following table:

| 1D Block size (P) | Number of possible 1-D SAD operations | Number of addition operations (n) |
|---|---|---|
| 1 | 16 | 0 |
| 2 | 8 | 8 |
| 3 | 5 | 10 |
| 4 | 4 | 12 |
| 5 | 3 | 8 |
| 6 | 2 | 10 |
| 7 | 2 | 12 |
| 8 | 2 | 14 |
| 9 | 1 | 8 |
| 10 | 1 | 9 |
| 11 | 1 | 10 |
| 12 | 1 | 11 |
| 13 | 1 | 12 |
| 14 | 1 | 13 |
| 15 | 1 | 14 |
| 16 | 1 | 15 |

Each adder has two inputs (ai and bi) each of which can be either one of the 16 inputs after masking or one of the adder outputs (ci). Instead of including 16 input multiplexors for each adder however, the input routing network 108 as shown in FIGS. 3 and 4 includes only 20 2-to-1 multiplexors (7 among adder units 302-316 and 13 among adder units 402-414). For example, adder unit 304 includes one multiplexor which provides the output of adder unit 302 as an input to adder unit 304 when a block size (P) is three.

Figure 6:
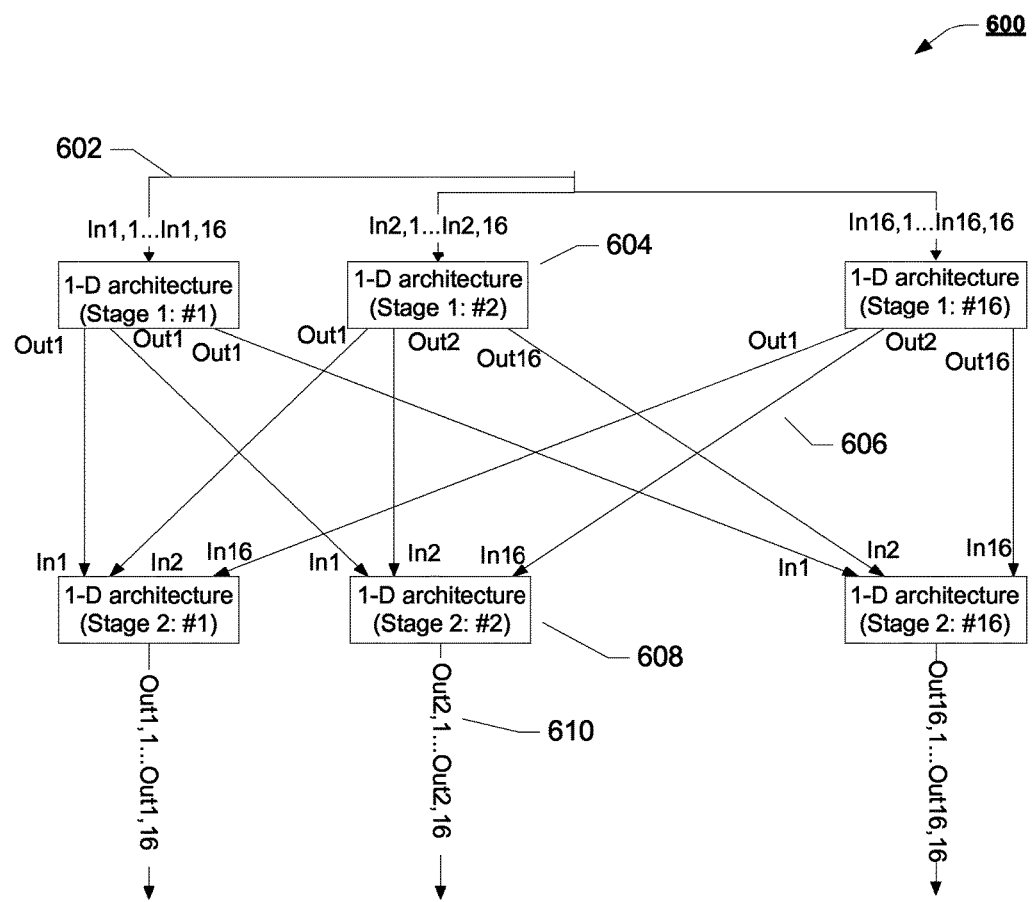
FIG. 6 is a block diagram of an example configurable two-dimensional adder tree architecture in accordance with some embodiments of the present invention.

FIG. 5 is a circuit diagram of an example output routing network in accordance with some embodiments of the present invention. Output routing network 500 provides the sixteen tree outputs 502-532 for any block size (P) in the appropriate order to accommodate a second stage of 1D adder trees, as shown in FIG. 6. Since the first output (502) is used for all block sizes, it includes seven 2-to-1 multiplexors, while the other outputs use fewer. In total, output routing network 500 includes 39 2-to-1 multiplexors. For a block size of 1, the outputs 502-532 correspond to the tree inputs 102, while for a block size of 9-16 outputs 504-532 are zero, while output 502 is output of adder unit 414. The following table provides the mapping of outputs 502-532 for each block size.

FIG. 6 is a block diagram of an example configurable two-dimensional (2D) adder tree architecture (ATA) in accordance with some embodiments of the present invention. 2D-ATA 600 can compute the sum of absolute differences (SAD) for any block size up to 16 by 16 and includes 2D input array 602, first stage of 16 1D adder trees 604, first stage outputs 606, second stage of 16 1D adder trees 608 and outputs 610. Each of the 32 1D adder trees in 2D-ATA 600 (first stage adder trees 604 and second stage adder trees 608) may comprise an adder tree 100 as described above. Conceptually, the first 1D adder tree in the first stage 604 receives a first column of 2D input array 602, the second 1D adder tree in the first stage 604 receives a second column of 2D input array 602 and so on, while the second stage of 1D adder trees 608 adds the resulting sums from first stage 604.

First stage outputs 606 are routed to the inputs of second stage 608 without additional hardware overhead. For example, the second output of the first adder tree of first stage 604 is routed to a first input of a second adder tree of second stage 608, and the second output of the sixteenth adder tree of first stage 604 is routed to a sixteenth input of a second adder tree of second stage 608.

Figure 7:
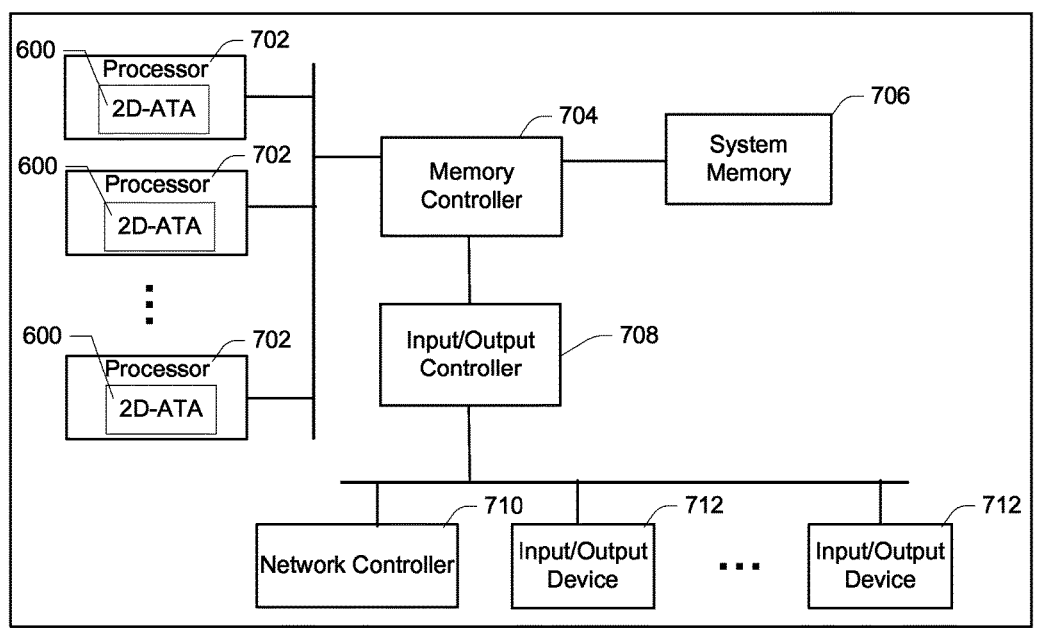
FIG. 7 is a block diagram of an example system in accordance with some embodiments of the present invention.

FIG. 7 is a block diagram of an example system suitable for implementing disclosed adder trees, in accordance with one example embodiment of the invention. System 700 is intended to represent any of a wide variety of traditional and non-traditional electronic appliances, laptops, desktops, cell phones, wireless communication subscriber units, wireless communication telephony infrastructure elements, personal digital assistants, set-top boxes, or any electric appliance that would benefit from the teachings of the present invention. In accordance with the illustrated example embodiment, system 700 may include one or more of processor(s) 702, memory controller 704, system memory 706, input/output controller 708, network controller 710, and input/output device(s) 712 coupled as shown in FIG. 7. As shown, processor(s) 702 include two-dimensional adder tree architecture (2D-ATA) 600, however, in other embodiments, 2D-ATA 600 may be included in other components of system 700, for example memory controller 704.

Processor(s) 702 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, processors(s) 702 are Intel® compatible processors. Processor(s) 702 may have an instruction set containing a plurality of machine level instructions that may be invoked, for example by an application or operating system.

|  | N = 1 | N = 2 | N = 3 | N = 4 | N = 5 | N = 6 | N = 7 | N = 8 | N = 9-16 |
|---|---|---|---|---|---|---|---|---|---|
| Out 1 | In 1 | A1_c | A2_c | A9_c | A3_c | A11_c | A11_c | A13_c | A15_c |
| Out 2 | In 2 | A2_c | A9_c | A10_c | A12_c | A12_c | A12_c | A14_c |  |
| Out 3 | In 3 | A3_c | A5_c | A11_c | A8_c |  |  |  |  |
| Out 4 | In 4 | A4_c | A10_c | A12_c |  |  |  |  |  |
| Out 5 | In 5 | A5_c | A8_c |  |  |  |  |  |  |
| Out 6 | In 6 | A6_c |  |  |  |  |  |  |  |
| Out 7 | In 7 | A7_c |  |  |  |  |  |  |  |
| Out 8 | In 8 | A8_c |  |  |  |  |  |  |  |
| Out 9 | In 9 |  |  |  |  |  |  |  |  |
| Out 10 | In 10 |  |  |  |  |  |  |  |  |
| Out 11 | In 11 |  |  |  |  |  |  |  |  |
| Out 12 | In 12 |  |  |  |  |  |  |  |  |
| Out 13 | In 13 |  |  |  |  |  |  |  |  |
| Out 14 | In 14 |  |  |  |  |  |  |  |  |
| Out 15 | In 15 |  |  |  |  |  |  |  |  |
| Out 16 | In 16 |  |  |  |  |  |  |  |  |

Memory controller 704 may represent any type of chipset or control logic that interfaces system memory 706 with the other components of system 700. In one embodiment, the connection between processor(s) 702 and memory controller 704 may be a point-to-point serial link. In another embodiment, memory controller 704 may be referred to as a north bridge.

System memory 706 may represent any type of memory device(s) used to store data and instructions that may have been or will be used by processor(s) 702. Typically, though the invention is not limited in this respect, system memory 706 will consist of dynamic random access memory (DRAM). In one embodiment, system memory 706 may consist of Rambus DRAM (RDRAM). In another embodiment, system memory 706 may consist of double data rate synchronous DRAM (DDRSDRAM).

Input/output (I/O) controller 708 may represent any type of chipset or control logic that interfaces I/O device(s) 712 with the other components of system 700. In one embodiment, I/O controller 708 may be referred to as a south bridge. In another embodiment, I/O controller 708 may comply with the Peripheral Component Interconnect (PCI) Express™ Base Specification, Revision 1.0a, PCI Special Interest Group, released Apr. 15, 2003.

Network controller 710 may represent any type of device that allows system 700 to communicate with other electronic appliances or devices. In one embodiment, network controller 710 may comply with a The Institute of Electrical and Electronics Engineers, Inc. (IEEE) 802.11b standard (approved Sep. 16, 1999, supplement to ANSI/IEEE Std 802.11, 1999 Edition). In another embodiment, network controller 710 may be an Ethernet network interface card.

Input/output (I/O) device(s) 712 may represent any type of device, peripheral or component that provides input to or processes output from system 700. The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A integrated circuit having a configurable two-dimensional adder tree architecture for computing a sum of array elements of arbitrary block sizes up to 16 by 16, the integrated circuit comprising:
    a first stage of the configurable two-dimensional adder tree architecture containing a plurality of one-dimensional adder trees; and
    a second stage of the configurable two-dimensional adder tree architecture containing a plurality of one-dimensional adder trees, wherein each and every one-dimensional adder tree of both the first and second stages of one-dimensional adder trees comprises:
        an input routing network;
        15 adder units;
        an output routing network;
        a first plurality of routing wires connecting the 15 adder units to the input routing network; and
        a second plurality of routing wires connecting the 15 adder units to the output routing network.

2. The integrated circuit of claim 1 wherein each one-dimensional adder tree further comprises masking inputs for block sizes greater than 8.

3. The integrated circuit of claim 1 wherein the input routing network comprises 20 2-to-1 multiplexers.

4. The integrated circuit of claim 3 wherein an input to a second adder unit comprises an output of a first adder unit when a block size is three.

5. The integrated circuit of claim 1 wherein the output routing network comprises 39 2-to-1 multiplexers.

6. The integrated circuit of claim 5 wherein a first output of the output routing network comprises an output of a fifteenth adder unit when a block size is ten.

7. The integrated circuit of claim 1 wherein the first and second stages of one-dimensional adder trees each comprise 16 adder trees.

8. The integrated circuit of claim 7 wherein a second output of a first adder tree of the first stage is routed, via at least one of the first plurality of routing wires and at least one of the second plurality of routing wires, to a first input of a second adder tree of the second stage.

9. An integrated circuit device comprising:
    a configurable two-dimensional adder tree architecture for computing a sum of array elements of arbitrary block sizes up to 16 by 16 comprising:
        a first stage containing a plurality of one-dimensional adder trees; and
        a second stage containing a plurality of one-dimensional adder trees, wherein each and every one-dimensional adder tree of both the first and second stages of one-dimensional adder trees comprises:
            an input routing network comprising a first plurality of multiplexers implemented in hardware;
            a plurality of adder units; and
            an output routing network, wherein the output routing network comprises 39 2-to-1 multiplexers implemented in hardware.

10. The integrated circuit device of claim 9 wherein the input routing network comprises 20 2-to-1 multiplexers implemented in hardware.

11. The integrated circuit device of claim 9 wherein the plurality of adder units comprises 15 two-input adders.

12. The integrated circuit device of claim 9 wherein the first and second stages of one-dimensional adder trees each comprise 16 adder trees.

13. The integrated circuit device of claim 12 wherein a second output of a sixteenth adder tree of the first stage is routed to a sixteenth input of a second adder tree of the second stage.

14. A system comprising:
    a network controller;
    a system memory; and
    a processor, the processor comprising:
        a configurable two-dimensional adder tree architecture for computing a sum of array elements of arbitrary block sizes up to 16 by 16 comprising:
            a first stage containing a plurality of one-dimensional adder trees; and
            a second stage containing a plurality of one-dimensional adder trees, wherein each and every one-dimensional adder tree of both the first and second stages of one-dimensional adder trees comprises:

an input routing network, wherein the input routing network comprises 20 2-to-1 multiplexers;
a plurality of adder units connected to the 20 2-to-1 multiplexers by a first plurality of routing wires; and
an output routing network.

15. The system of claim 14 wherein each one-dimensional adder tree further comprises masking inputs for block sizes greater than 8.

16. The system of claim 14 wherein the first and second stages of one-dimensional adder trees each comprise 16 adder trees.

17. The system of claim 14 wherein the plurality of adder units comprises 15 two-input adders.

18. The system of claim 17 wherein an input to a second adder unit comprises an output of a first adder unit when a block size is three.

19. The system of claim 14 wherein the output routing network comprises 39 2-to-1 multiplexers, and wherein the plurality of adder units are connected to the 39 2-to-1 multiplexers by a second plurality of routing wires.

20. The system of claim 19 wherein a first output of the output routing network comprises an output of a fifteenth adder unit when a block size is sixteen.

\* \* \* \* \*